(12) United States Patent
Rumbaugh

(10) Patent No.: US 8,575,236 B1
(45) Date of Patent: Nov. 5, 2013

(54) ACRYLIC FIREPROOF COATING AND METHOD OF PREPARING

(71) Applicant: Robert W. Rumbaugh, Pinellas Park, FL (US)

(72) Inventor: Robert W. Rumbaugh, Pinellas Park, FL (US)

(73) Assignee: Acrylall, LLC, Pinellas Park, FL (US)

( * ) Notice: Subject to any disclaimer, the term of this patent is extended or adjusted under 35 U.S.C. 154(b) by 0 days.

(21) Appl. No.: 13/676,849

(22) Filed: Nov. 14, 2012

Related U.S. Application Data

(63) Continuation-in-part of application No. 13/317,668, filed on Oct. 25, 2011.

(51) Int. Cl.
*C08J 9/32* (2006.01)

(52) U.S. Cl.
USPC ........... 523/218; 524/376; 524/413; 524/415; 524/423; 524/424; 524/428; 524/430; 524/442

(58) Field of Classification Search
USPC ......... 524/376, 413, 415, 423, 424, 428, 430, 524/442; 523/218
See application file for complete search history.

(56) References Cited

U.S. PATENT DOCUMENTS

2012/0073474 A1* 3/2012 Constantz et al. ............ 106/738

* cited by examiner

*Primary Examiner* — Edward Cain

(57) ABSTRACT

An acrylic fireproof coating comprised of constituents including water, styrene acrylic polymer, refined white dolomite #0, processed granite #70, processed white marble #90, calcium sulfate, silicon concentrate 10 percent, titanium dioxide, polyethylene glycol, butoxyethanol, light mineral spirits, #5 nano beads and phosphorus trichloride PCl 3. Also included is the method of preparing the acrylic fireproof coating.

2 Claims, No Drawings

ACRYLIC FIREPROOF COATING AND METHOD OF PREPARING

RELATED APPLICATION

The present application is a continuation in part of pending application Ser. No. 13/317,668 filed Oct. 25, 2011, the subject matter of which is incorporated herein by reference.

BACKGROUND OF THE INVENTION

1. Field of the Invention

The present invention relates to an acrylic fireproof coating and method of preparing and more particularly pertains to a method of preparing an acrylic polymer mixture for constituting a fireproof coating for the construction industry.

2. Description of the Prior Art

The use of fireproof coatings is known in the prior art. More specifically, fireproof coatings previously devised and utilized for fireproofing purposes are known to consist basically of familiar, expected, and obvious mixtures, notwithstanding the myriad of mixtures encompassed by the crowded prior art which has been developed for the fulfillment of countless objectives and requirements.

While known mixtures fulfill their respective, particular objectives and requirements, the literature does not describe an acrylic fireproof coating and method of preparing as set forth herein for the construction industry.

In this respect, the acrylic fireproof coating and method of preparing according to the present invention substantially departs from the conventional concepts and designs of the prior art, and in doing so provides an apparatus primarily developed for the purpose of improving fireproof constructions.

Therefore, it can be appreciated that there exists a continuing need for a new and improved acrylic fireproof coating and method of preparing which can be used for improving the construction industry. In this regard, the present invention substantially fulfills this need.

SUMMARY OF THE INVENTION

In view of the disadvantages inherent in the known types of fireproof coatings now present in the prior art, the present invention provides an improved acrylic fireproof coating and method of preparing. As such, the general purpose of the present invention, which will be described subsequently in greater detail, is to provide a new and improved acrylic fireproof coating and method of preparing which has all the advantages of the prior art and none of the disadvantages.

To attain this, the present invention essentially comprises a method of preparing an acrylic polymer mixture for constituting a fireproof construction coating. The method comprises the steps of providing 5247 lbs-355 gallons of constituents including 75 gallons-490 lbs of water, 16 60 lb bags-960 lbs of styrene acrylic polymer, 5 60 lb bags-300 lbs of refined white dolomite #0, 10 60 lb bags-600 lbs of processed granite #70, 5 60 lb bags-300 lbs of processed white marble #90, 38 60 lb bags-2280 lbs of calcium sulfate, 17.5 lb of silicon concentrate 10 percent, 2 50 lb bags-100 lbs of titanium dioxide, 52 lbs of polyethylene glycol, 52 lbs of butoxyethanol, 52 lbs of light mineral spirits, 12 ounces-0.75 lbs of #5 nano beads and 3 30 lb bags-90 lbs of phosphorus trichloride PCl 3; heating the water to 70 degrees Celsius and adding the calcium sulfate at low speed, adding half of the dolomite at low speed leaving a remaining half, heating the acrylic and silicon to 135 degrees, adding the mineral spirits at high speed, adding the titanium dioxide at high speed, adding half of the marble and granite leaving a remaining half; adjusting the temperature of the heated constituents to 50 degrees Celsius and adding the remaining half of the dolomite at high speed, adding the butoxyethanol at high speed, adding half of the polyethylene glycol at high speed leaving a remaining half, adding half of the heated acrylic mix leaving a remaining half; and blending the blended constituents at high speed until the temperature cools to ambient and adding the remaining half of the polyethylene glycol at high speed, adding the nano beads at medium speed, adding the remaining half of the acrylic mix when cooled to 80 degrees Celsius, adding the phosphorus trichloride PCl 3; at medium speed, and adding the remaining half of the marble and granite at medium speed. The invention also includes the mixture prepared thereby.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved acrylic fireproof coating which has all of the advantages of the prior art fireproof coatings and none of the disadvantages.

It is another object of the present invention to provide a new and improved acrylic fireproof coating which may be easily and efficiently formulated and marketed.

It is further object of the present invention to provide a new and improved acrylic fireproof coating and method of preparing which is durable and reliable.

An even further object of the present invention is to provide a new and improved acrylic fireproof coating and method of preparing which is susceptible of a low cost of manufacture with regard to both materials and labor, and which accordingly is then susceptible of low prices of sale to the public, thereby making such acrylic fireproof coating and method of preparing economically available to the public.

Even still another object of the present invention is to provide a method of preparing an acrylic fireproof coating for improving the construction industry.

Lastly, it is an object of the present invention to provide a new and improved acrylic fireproof coating comprised of constituents including water, styrene acrylic polymer, refined white dolomite #0, processed granite #70, processed white marble #90, calcium sulfate, silicon concentrate 10 percent, titanium dioxide, polyethylene glycol, butoxyethanol, light mineral spirits, #5 nano beads and phosphorus trichloride PCl 3. Also included is the method of preparing the acrylic fireproof coating.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying descriptive matter in which there is illustrated an embodiment of the invention.

With reference now to the descriptive material, the preferred embodiment of the new and improved acrylic fireproof coating embodying the principles and concepts of the present invention will be described. Such coating is comprised of a plurality of constituents which include:

16 60 lb bags-960 lbs of the styrene acrylic polymer,
5 60 lb bags-300 lbs of the refined white dolomite #0,
10 60 lb bags-600 lbs of the processed granite #70,
5 60 lb bags-300 lbs of the processed white marble #90,
38 60 lb bags-2280 lbs of the calcium sulfate,
17.5 lb of the silicon concentrate 10 percent,
2 50 lb bags-100 lbs of the titanium dioxide,
52 lbs of the polyethylene glycol,
52 lbs of the butoxyethanol,
52 lbs of the light mineral spirits,
12 ounces-0.75 lbs of the #5 nano beads and
3 30 lb bags-90 lbs of the phosphorus trichloride PCl 3.

The present invention also includes the method of preparing the acrylic polymer mixture for constituting a fireproof construction coating. The method comprises the steps of providing 5247 lbs-355 gallons of constituents including 75 gallons-490 lbs of water, 16 60 lb bags-960 lbs of styrene acrylic polymer, 5 60 lb bags-300 lbs of refined white dolomite #0, 10 60 lb bags-600 lbs of processed granite #70, 5 60 lb bags-300 lbs of processed white marble #90, 38 60 lb bags-2280 lbs of calcium sulfate, 17.5 lb of silicon concentrate 10 percent, 2 50 lb bags-100 lbs of titanium dioxide, 52 lbs of polyethylene glycol, 52 lbs of butoxyethanol, 52 lbs of light mineral spirits, 12 ounces-0.75 lbs of #5 nano beads and 3 30 lb bags-90 lbs of phosphorus trichloride PCl 3.

The next step is heating the water to 70 degrees Celsius and adding the calcium sulfate at low speed, adding half of the dolomite at low speed leaving a remaining half, heating the acrylic and silicon to 135 degrees, adding the mineral spirits at high speed, adding the titanium dioxide at high speed, adding half of the marble and granite leaving a remaining half;

The next step is adjusting the temperature of the heated constituents to 50 degrees Celsius and adding the remaining half of the dolomite at high speed, adding the butoxyethanol at high speed, adding half of the polyethylene glycol at high speed leaving a remaining half, adding half of the heated acrylic mix leaving a remaining half.

The final step of the method is blending the blended constituents at high speed until the temperature cools to ambient and adding the remaining half of the polyethylene glycol at high speed, adding the nano beads at medium speed, adding the remaining half of the acrylic mix when cooled to 80 degrees Celsius, adding the phosphorus trichloride PCl 3 at medium speed, and adding the remaining half of the marble and granite at medium speed.

As to the manner of usage and operation of the present invention, the same should be apparent from the above description. Accordingly, no further discussion relating to the manner of usage and operation will be provided.

With respect to the above description then, it is to be realized that the optimum components and proportions of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An acrylic fireproof coating comprised of constituents including:
    75 gallons of water,
    960 lbs of styrene acrylic polymer,
    300 lbs of refined white dolomite,
    600 lbs of processed granite,
    300 lbs of processed white marble,
    2280 lbs of calcium sulfate,
    17.5 lb of silicon concentrate 10 percent,
    100 lbs of titanium dioxide,
    52 lbs of polyethylene glycol,
    52 lbs of butoxyethanol,
    52 lbs of light mineral spirits,
    0.75 lbs of nonporous silica microspheres, and
    90 lbs of phosphorus trichloride PCl 3.

2. A method of preparing an acrylic polymer mixture for constituting a fireproof construction coating, the method comprising the steps of:
    providing 355 gallons of constituents including
        75 gallons of water,
        960 lbs of styrene acrylic polymer,
        5 60 lb bags-300 lbs of refined white dolomite,
        600 lbs of processed granite,
        300 lbs of processed white marble,
        2280 lbs of calcium sulfate,
        17.5 lb of silicon concentrate 10 percent,
        100 lbs of titanium dioxide,
        52 lbs of polyethylene glycol,
        52 lbs of butoxyethanol,
        52 lbs of light mineral spirits,
        0.75 lbs of nonporous silica microspheres, and
        90 lbs of phosphorus trichloride PCl 3;
    heating the water to 70 degrees Celsius and adding the calcium sulfate at low speed, adding half of the dolomite at low speed leaving a remaining half, heating the acrylic and silicon to 135 degrees, adding the mineral spirits at high speed, adding the titanium dioxide at high speed, adding half of the marble and granite leaving a remaining half;
    adjusting the temperature of the heated constituents to 50 degrees Celsius and adding the remaining half of the dolomite at high speed, adding the butoxyethanol at high speed, adding half of the polyethylene glycol at high speed leaving a remaining half, adding half of the heated acrylic mix leaving a remaining half; and
    blending the blended constituents at high speed until the temperature cools to ambient and adding the remaining half of the polyethylene glycol at high speed, adding the remaining half of the acrylic mix when cooled to 80 degrees Celsius, adding the phosphorus trichloride PCl 3 at medium speed, and adding the remaining half of the marble and granite at medium speed.

\* \* \* \* \*